United States Patent Office 3,332,791
Patented July 25, 1967

3,332,791
PROCESS FOR PRODUCING PORTLAND
CEMENT COMPOSITIONS
John Charles Steinberg and Kenneth Russell Gray, Shelton, Wash., assignors to Rayonier Incorporated, New York, N.Y., a corporation of Delaware
No Drawing. Filed May 12, 1964, Ser. No. 366,920
7 Claims. (Cl. 106—92)

This invention relates to hydraulic cement compositions such as Portland and Portland-type cement slurries containing organic dispersants. The organic dispersants used in the process of the invention are characterized by the ability to materially reduce the amount of water required to attain a given workability in a cement slurry thereby resulting in a surprising improvement in the strength of products made therefrom, without retarding the setting time excessively.

In the following, the terms "cement slurry" and "cement dispersion" are used interchangeably. Both terms are intended to include aqueous slurries of hydraulic cement by itself, mixtures of hydraulic cement and sand (mortars) and mixtures of hydraulic cement, sand and gravel (concretes).

It has been suggested in many publications relating to cement products that various types of carbohydrates such as reducing sugars, partially hydrolyzed starches, and the like, be used to disperse, render more workable and retard the setting time of slurries of hydraulic cement. Such compounds are known to be effective retardants. None, however, has proven itself practical in general use. The retarding effect of such carbohydrates on cement slurries is so great that any quantity of said carbohydrate that is effective as a dispersant and water-reducing agent also retards the setting time beyond permissible limits. As a result, rather than being considered useful in cement slurries they are usually considered to be harmful and are carefully removed where they occur in combination with other types of dispersants such as spent sulfite liquor solids.

After considerable experimental work we have discovered a method of overcoming the undesirable characteristics of water-soluble carbohydrates such as mono-, di- and oligosaccharides when used as dispersants for cement slurries while retaining and enhancing their desirable qualities. By our method a portion of the carbohydrate is converted into complex products and the resultant blend of unchanged carbohydrate and complex products may be used as such, or concentrated if desired. This blend solution is an unexpectedly effective dispersant and water-reducing agent for slurries of hydraulic cement.

In the process of our invention the aforementioned product is formed by digestion of a suitable water-soluble carbohydrate at an elevated temperature in a solution of a water-soluble alkali metal or ammonium sulfite or bisulfite until from about 15 to 75 percent of the carbohydrate present is converted into water-soluble complexes. Suitable carbohydrates for use in the invention include glucose, sucrose, mannose, xylose and arabinose among the sugars. In addition, water-soluble carbohydrates such as partially hydrolyzed starches and hemicelluloses such as those obtained by the steam hydrolysis of wood chips, etc., are also suitable. Digestion is accomplished by heating a 20 to 70 percent aqueous solution of the carbohydrate with sufficient sulfite or bisulfite to provide from about 0.05 to 0.40 part $SO_2$ per part of carbohydrate at a temperature of from about 120 to 170° C. until a substantial proportion of said $SO_2$ is consumed. For example, an operation may be carried out by digesting corn syrup having a dextrose equivalent of 41.5 to 44.5 with sodium bisulphite in an amount equivalent to 0.10 part $SO_2$ per part of corn syrup solids for 30 minutes at 140° C., the reactants comprising a solution having a concentration of 45% solids. This normally takes from 20 to 40 minutes after the desired digestion temperature has been attained. Digestion under these conditions converts from about 15 to 75 percent of the soluble carbohydrate present into partially unidentified complex water-soluble organic compounds. The extent of conversion into complex water-soluble organic compounds is measured by the disappearance of total carbohydrate, said total carbohydrate being measured by chromatographic determination of monosaccharide following acid hydrolysis [see method described by J. E. Jeffery, E. V. Partlow and W. J. Polglase, Anal. Chem. 32, 1774 (1960)]. The product liquor containing its blend of carbohydrate and conversion products can be used in this form or it can be concentrated if desired. It is the preferred practice not to take it to dryness, because of the hygroscopic nature of the conversion products. The dispersant is preferably added to the cement slurry in an amount varying from 0.01 to 0.30 percent by weight, on a dry basis, based on the weight of the cement.

The following examples illustrate the preparation of the improved products of the invention and their use and utility in hydraulic cement slurries as dispersants and water-reducing agents.

Example 1

1333 grams of glucose with an 8.8 percent moisture content and 378 grams of $Na_2S_2O_5$ with a 3 percent moisture content were dissolved in 1794 grams of water. The resulting solution had a solids content of 43.6 percent, a pH of 4.55 and a viscosity of 9.2 centipoises at 25° C. It was placed in a suitable closed stainless steel digester and heated to 140° C. in 8 minutes. After 20 minutes digestion at that temperature it was cooled to room temperature. The product solution contained 41.3 percent total solids, had a pH of 2.9 and a viscosity of 8.8 centipoises at 25° C. The residual $SO_2$ had been reduced to 1.8 percent on a dry basis. Before use as a dispersant in cement dispersions it was neutralized to a pH of 7.0 with NaOH. Analysis of the foregoing dispersant showed that 34.3 percent of the glucose had been converted to complex water-soluble conversion products. This dispersant was designated as Product A.

Example 2

232 grams of $Na_2S_2O_5$ with a 4.0 percent moisture content and 1500 grams of sucrose were dissolved in 1756 grams of water. The resulting solution had a solids content of 49.0 percent, a pH of 4.3 and a viscosity of 14 centipoises at 25° C. It was placed in a suitable closed stainless steel digester and heated to 165° C. in 13 minutes. After 10 minutes digestion at that temperature it was quickly cooled to room temperature. The digested product solution had 47.7 percent total solids, a pH of 2.7, a viscosity of 12 centipoises at 25° C., and 0.1 percent residual $SO_2$ on a dry basis. After neutralization to a pH of 9.0 a small amount of fungicide was added. Analysis showed that 58.4 percent of the sucrose had been converted to complex water-soluble conversion products. This product solution was designated as Product B.

Example 3

2295 grams of light corn syrup containing 76.2 percent total solids of which 92 percent were free and polymeric glucose, 187.6 grams of $Na_2SO_3$ with a moisture content of 8.2 percent and 136.2 grams of $Na_2S_2O_5$ with a moisture content of 4.6 percent were dissolved in 1496 grams of water. The solution contained 48.9 percent total solids and had a pH of 6.6 and a viscosity of 22 centipoises at 25° C. It was placed in a closed digester and heated to 165° C. in 8 minutes, digested for 30 minutes at that temperature and then cooled to room temperature. The resultant product solution had a total solids content of 41.6 percent, a pH of 4.6, a viscosity of 12 centipoises at 25° C., and a residual $SO_2$ content of 0.1 percent. Before use it was neutralized to a pH of 7 with NaOH solution. Analysis showed that 47.5 percent of the glucose had been converted to other materials during the digestion stage. This dispersant solution was designated Product C.

Example 4

1700 grams of the same corn syrup as in the previous example, 278 grams of $Na_2SO_3$ with a moisture content of 8.2 percent, and 202 grams of $Na_2S_2O_5$ with a moisture content of 4.6 percent were dissolved in 1310 grams of water. The solution contained 50.7 percent of total solids and the pH was 6.8 and the viscosity 26 centipoises at 25° C. It was placed in a closed digester and the temperature raised to 165° C. in 10 minutes. After 30 minutes digestion at that temperature it was cooled to room temperature. The product solution contained 46.3 percent solids and 0.2 percent residual $SO_2$. The pH was 4.8 and the viscosity 12 centipoises at 25° C. The solution was neutralized to pH 7.0 before use. Analysis showed that 74.1 percent of the glucose had been converted to complex conversion products. This product was designated Product D.

Example 5

A sample of a steam prehydrolysis condensate from the digestion of wood chips was obtained. It had a total solids content of 42.7 percent of which 71.6 percent was water soluble carbohydrate material composed of oligosaccharides and free sugars having the following analysis on a hydrolyzed basis: 9.6 percent galactose, 13.7 percent glucose, 36.6 percent mannose, 2.7 percent arabinose and 9.0 percent xylose on a dry weight basis. To 3240 grams of this condensate solution was added 152 grams of $Na_2SO_3$ with a moisture content of 10 percent and 107 grams of $Na_2S_2O_5$ with a moisture content of 4.0 percent. The resultant solution had a total solids content of 46.4 percent, a pH of 7.3 and a viscosity of 30 centipoises at 25° C. It was placed in a closed digester and raised to a temperature of 165° C. in 9 minutes and digested at that temperature for 15 minutes. On cooling to room temperature it had a total solids content of 43.6 percent, a pH of 4.3 and a viscosity of 14 centipoises at 25° C. It was then neutralized with NaOH to pH 9.0 and a small amount of fungicide added. Analysis showed that 43.8 percent of the original sugars had been converted to complex conversion products. This solution was designated Product E.

Example 6

2500 grams of corn syrup having a specified dextrose equivalent of 41.5 to 44.5 and a total solids content of 56.7 percent of which 99.5 percent was glucose and 216 grams of $Na_2S_2O_5$ with a moisture content of 2.8 percent were dissolved in 944 grams of water. The resulting solution had a total solids content of 44.1 percent, a pH of 5.0 and a viscosity of 13 centipoises at 25° C. It was heated to 140° C. in a closed digester in 8 minutes and held at that temperature for 30 minutes and cooled to room temperature. The product had a total solids content of 44.0 percent, a residual $SO_2$ content of 2.9 percent (on a dry basis) and a viscosity of 12 centipoises at 25° C. Analysis showed that 24.7 percent of the glucose had been converted to water soluble complexes. The solution was neutralized with NaOH to a pH of 7.0 and designated as Product F.

Example 7

2500 grams of the same corn syrup as in the preceding example and 296 grams of $NH_4HSO_3$ solution with a 47.9 percent $SO_2$ content were mixed with 684 grams of water. The resultant solution had a total solids content of 40.9 percent, a pH of 4.4 and a viscosity of 15 centipoises at 25° C. It was heated to 140° C. in 6 minutes in a closed digester, held at that temperature for 30 minutes and then cooled to room temperature. The product solution thus formed had a total solids content of 41.6 percent, a residual $SO_2$ content of 1.1 percent (on a dry basis), a pH of 2.8 and a viscosity of 12 centipoises at 25° C. Analysis showed that 27.3 percent of the glucose had been converted to water-soluble complexes. The product was neutralized to a pH of 7.0 with NaOH and designated Product G.

The mixed product solutions of carbohydrates and carbohydrate conversion products of the present invention are effectively used to disperse and reduce the water requirements for cement slurries as neutral or near neutral (i.e., pH 6–9) solutions. We prefer to add the products directly to water used in forming a cement slurry. The product solutions, however, can be added to the cement slurry itself at any stage during its preparation prior to the time appreciable chemical reaction has taken place between the cement and water, or they can be added to the ingredients themselves if desired. The following examples illustrate the use and efficacy of the complex product solutions in the treatment of cement slurries.

Example 8

Concrete test samples were prepared with and without the addition of Products A through E of Examples 1 through 5, respectively. In addition, comparative test samples were prepared containing equivalent amounts of the undigested starting materials from which Products A through E were prepared. The cement used was a standard construction grade Type–1 Portland cement. The sand was air dried and classified into the following fractions: 100 percent passed a 4-mesh screen, 15 percent was retained on an 8-mesh screen, 15 percent on a 16-mesh screen, 30 percent on a 30-mesh screen, 24 percent on a 50-mesh screen and the balance of 16 percent on a 100-mesh screen. The gravel was classified into the following fractions: 100 percent passed a 0.75 inch screen, 73.8 percent was retained on a 0.375 inch screen and the balance was retained on a 4-mesh screen. The gravel was soaked in water and drained for 5 minutes prior to use.

Individual batches of concrete were prepared by mixing 20,070 grams of the foregoing air-dried sand for 2 minutes with 6400 grams of the cement. To this mixture was added 21,220 grams of soaked, drained gravel (equivalent to 20,790 grams of gravel saturated with water but dry on the surface and 430 grams of water, 330 grams of which were necessary to saturate the sand and 100 grams of excess which was available as mixing water) and water in an amount such that the net mixing water was as shown in column 4 of Table I. (The term "net mixing water" refers to the difference between the total water content of the concrete and the water required to render the sand and gravel saturated but surface-dry.) The materials listed in column 2 of Table I, and termed "admixtures" therein, were dissolved in and added with the mixing water. This slurry was mixed for 2 minutes, permitted to stand 3 minutes and remixed for 1 minute. The amount of water added in each case was that required to give the plastic concrete a nominal slump of 2.5 inches as determined by ASTM methods. Air content, time to initial and final set and the 7 and 28 day compressive strengths for each concrete test sample were also determined by standard ASTM methods and recorded in Table I.

TABLE I

| Concrete Batch No. | Admixture | | Net Mixing Water, g. | Air Content, Percent by Volume | Time to Set | | Compressive Strength, p.s.i. | |
|---|---|---|---|---|---|---|---|---|
| | Name | Dosage, Percent of Cement (Dry Basis) | | | Initial, hrs. | Final, hrs. | 7 Day Cure | 28 Day Cure |
| 1 | None | | 3,450 | 1.8 | 4.1 | 6.3 | 2,290 | 4,170 |
| 2 | Glucose [1] | 0.19 | 3,131 | 2.0 | 8.2 | 11.2 | 3,470 | 5,207 |
| 3 | Product A | 0.19 | 3,145 | 2.1 | 6.4 | 8.2 | 3,610 | 5,805 |
| 4 | Sucrose [1] | 0.19 | 3,071 | 2.2 | 14.6 | 23.0 | 3,370 | 4,588 |
| 5 | Product B | 0.19 | 3,144 | 2.2 | 6.7 | 8.5 | 3,590 | 6,005 |
| 6 | Corn Syrup [1] | 0.19 | 3,074 | 2.0 | 7.5 | 9.5 | 3,680 | 5,140 |
| 7 | Product C | 0.19 | 3,094 | 2.3 | 5.6 | 7.5 | 4,070 | 6,135 |
| 8 | Product D | 0.19 | 3,094 | 2.4 | 5.0 | 6.8 | 3,720 | 5,806 |
| 9 | Wood Sugars [1] | 0.19 | 3,097 | 2.8 | 6.8 | 8.9 | 3,550 | 5,585 |
| 10 | Product E | 0.19 | 3,095 | 3.0 | 5.4 | 7.5 | 3,670 | 5,735 |

[1] No digestion.

The foregoing results illustrate the unexpected and synergistic advantages obtained both in strength of product and reduced retarding effect that results from the digestion of the carbohydrates with soluble salts of sulfurous acid. Averaging the results since all tests were conducted under similar conditions we get the following results:

Concretes were made and tested by the same process as that used in Example 8, using F and G as admixtures. The results obtained are shown in Table II.

TABLE II

| Concrete Batch No. | Admixture | | Net Mixing Water, g. | Air Content, Percent by Volume | Time to Set | | Compressive Strength, p.s.i. | |
|---|---|---|---|---|---|---|---|---|
| | Name | Dosage, Percent of Cement (Dry Basis) | | | Initial, hrs. | Final, hrs. | 7 Day Cure | 28 Day Cure |
| 1 | None | | 3,240 | 1.8 | 4.1 | 6.3 | 3,270 | 5,440 |
| 2 | Product F | 0.19 | 2,806 | 1.9 | 5.6 | 7.7 | 4,750 | 6,580 |
| 3 | Product G | 0.19 | 2,806 | 2.0 | 6.2 | 8.2 | 4,650 | 7,000 |

Average time for initial set (hours):
  Without carbohydrate admixture _____ 4.1
  With undigested carbohydrates _____ 9.3
  With digested carbohydrates _____ 5.8
Average time for final set (hours):
  Without carbohydrate admixture _____ 6.3
  With undigested carbohydrate _____ 13.2
  With digested carbohydrate _____ 7.7
Average strength—cured 7 days (p.s.i.):
  Without carbohydrate admixture _____ 2290
  With undigested carbohydrate _____ 3518
  with digested carbohydrate _____ 3732
Average strength—cured 28 days (p.s.i.):
  Without carbohydrate admixture _____ 4170
  With undigested carbohydrate _____ 5130
  With digested carbohydrate _____ 5897

These results demonstrate that digestion of the carbohydrate with soluble salts of sulfurous acid increases the strength of the products formed from a cement slurry even beyond that normally attained by the addition of the undigested carbohydrate while simultaneously preventing excessive retardation of the setting time.

*Example 9*

Each of the digested carbohydrates added to the concretes listed in Table I employed sodium salts of sulfurous acid as digestion agents. Ammonium salts can also be used. This example demonstrates the use of ammonium bisulfite as the digestion agent. Products F and G from Examples 6 and 7 above were prepared in an identical manner from the same large batch of corn syrup except that in Example 6 the digestion agent was $Na_2S_2O_5$ and in Example 7 it was $NH_4HSO_3$.

*Example 10*

300 grams of D-(+)-mannose and 166 grams of $Na_2S_2O_5$ with a moisture content of 3.4 percent were dissolved in 590 grams of water. The resultant solution was heated to 140° C. in 7 minutes in a closed stainless steel autoclave. After 40 minutes digestion at that temperature, it was quickly cooled to room temperature. The solution was neutralized to pH 7.0 with NaOH before use. Analysis indicated that 61.2 percent of the mannose had been converted to complex conversion products. This product was labeled Product H.

*Example 11*

329 grams of glucose having a moisture content of 8.8 percent and 166 grams of $Na_2S_2O_5$ having a moisture content of 3.4 percent were dissolved in 561 grams of water. The resulting solution had a solids content of 40.3 percent, a pH of 4.75, and a viscosity of 9.2 centipoises at 25° C. This solution was placed in a closed stainless digester and heated to 140° C. in 11 minutes. After 15 minutes digestion at that temperature it was quickly cooled to room temperature. The digested product had a 40.0 percent total solids content, a pH of 3.3 and a viscosity of 8.2 centipoises at 25° C. This solution was neutralized to pH 7.0 with NaOH prior to its use and labeled Product I. Analysis showed that 37.2 percent of the glucose had been converted to complex conversion products.

*Example 12*

166 grams of $Na_2S_2O_5$ containing 3.4 percent moisture and 300 grams of D-(+)-xylose were dissolved in 590 grams of water. The resulting solution had a solids content of 39.3 percent, a pH of 5.2, and a viscosity of 8.3 centipoises at 25° C. The solution was placed in a closed stainless steel digester and heated to 140° C. in 13 minutes. After 15 minutes digestion at 140° C., it was rapidly cooled to room temperature. The digested product solution had a 38.6 percent solids content, a pH of 3.3 and a viscosity of 8.0 centipoises at 25° C. The solution was neutralized to pH 7.0 with NaOH prior to use and designated as Product J. Analysis showed that 16.3 percent of the xylose had been converted by the digestion.

*Example 13*

166 grams of $Na_2S_2O_5$ containing 3.4 percent moisture and 300 grams of L-(+)-arabinose were dissolved in 590 grams of water. The resultant solution had a solids content of 39.0 percent and a viscosity of 8.5 centipoises at 25° C. The solution was placed in a closed stainless steel digester and heated to 140° C. in 9 minutes. After 15 minutes digestion at 140° C. it was rapidly cooled to room temperature. The digested product had a 38.0 percent solids content, a 3.2 pH and a viscosity of 8.0 centipoises at 25° C. The solution was neutralized to pH 7.0 with NaOH prior to use and labeled Product K. Analysis showed that 34.2 percent of the arabinose had been converted to conversion complexes.

*Example 14*

Concrete test samples were prepared from the foregoing samples and tested by the same methods as in Example 8. The results are shown in Table III.

ods of the present invention increases the strength of the concrete formed from slurries containing the same even beyond that normally obtained by the addition of the undigested carbohydrate while simultaneously preventing excessive retardation of the setting time.

*Example 15*

1695 grams of the same corn syrup as used in Example 3 and 401 grams of $Na_2S_2O_5$ with a moisture content of 4.6% were dissolved in 1406 grams of water. The solution contained 45.9% of total solids, and the pH was 4.8 and the viscosity 16 centipoises at 25° C. It was placed in a closed digester and the temperature raised to 140° C. in 10 minutes. After 30 minutes digestion at that temperature it was cooled to room temperature. The product solution contained 41.6% solids and 7.1% residual $SO_2$. The pH was 3.8 and the viscosity 15 centipoises at 25° C. The solution was neutralized with NaOH to pH 7.0 before use. Analysis showed that 20.2% of the glucose had been converted to complex conversion products. This product was designated Product L.

*Example 16*

Mortar test samples were prepared with and without the addition of Product L of Example 15. The cement used was a standard construction grade Type–1 Portland

TABLE III

| Concrete Batch No. | Admixture | | Net Mixing Water, g. | Air Content, Percent by Volume | Time to Set | | Compressive Strength, p.s.i. | |
|---|---|---|---|---|---|---|---|---|
| | Name | Dosage, Percent of Cement (Dry Basis) | | | Initial, hrs. | Final, hrs. | 7 Day Cure | 28 Day Cure |
| 1 | None | 0 | 3,140 | 1.5 | 4.0 | 5.5 | 2,200 | 5,250 |
| 2 | Mannose [1] | 0.19 | 2,940 | 1.65 | 8.2 | 10.4 | 3,870 | 5,140 |
| 3 | Product H | 0.19 | 2,995 | 1.8 | 5.5 | 7.3 | 3,970 | 5,740 |
| 4 | Glucose [1] | 0.19 | 3,041 | 1.8 | 6.2 | 10.3 | 3,310 | 5,455 |
| 5 | Product I | 0.19 | 2,956 | 1.85 | 4.9 | 6.6 | 4,340 | 6,310 |
| 6 | Xylose [1] | 0.19 | 2,990 | 1.8 | 5.5 | 13.5 | 3,310 | 5,945 |
| 7 | Product J | 0.19 | 2,974 | 1.9 | 4.9 | 6.8 | 4,440 | 6,345 |
| 8 | Arabinose [1] | 0.19 | 3,060 | 1.7 | 6.1 | 17.5 | 3,010 | 4,850 |
| 9 | Product K | 0.19 | 2,999 | 1.7 | 5.9 | 10.0 | 4,140 | 5,265 |

[1] No digestion.

The foregoing results illustrate the unexpected and synergistic advantages attained both in strength of product and reduced retarding effect that results from the digestion of the carbohydrates with soluble salts of sulfurous acid. Averaging the foregoing results (all tests were conducted under identical conditions) we get the following:

Average time for initial set (hours):
  Without carbohydrate admixture _____ 4.0
  With undigested carbohydrates _____ 6.5
  With digested carbohydrates _____ 5.3
Average time for final set (hours):
  Without carbohydrate admixture _____ 5.5
  With undigested carbohydrates _____ 12.9
  With digested carbohydrates _____ 7.7
Average strength—cured 7 days (p.s.i.):
  Without carbohydrate admixture _____ 2200
  With undigested carbohydrates _____ 3380
  With digested carbohydrates _____ 4175
Average strength—cured 28 days (p.s.i.):
  Without carbohydrate admixture _____ 5250
  With undigested carbohydrates _____ 5350
  With digested carbohydrates _____ 5915

These results demonstrate that digestion of the carbohydrate with soluble salts of sulfurous acid by the methcement. The sand was air dried and classified into the following fractions: 100% passed a 4-mesh screen, 15% was retained on a 16-mesh screen, 26% on a 30-mesh screen, 42% on a 50-mesh screen and the balance of 17% on a 100-mesh screen.

Individual batches of mortar were prepared by (1) adding to the mixing bowl an amount of water such that the net mixing was as shown in column 4 of Table IV, said water containing in solution the material listed in column 2 of Table IV, (2) adding 1090 grams of the cement, (3) mixing for 30 seconds at slow speed (140 revolutions per minute), (4) adding 3000 grams of the sand over a 30-second period while mixing at the said slow speed, (5) mixing for 30 seconds at medium speed (280 revolutions per minute), (6) ceasing mixing for 1.5 minutes during which time the mortar which had collected on the side of the bowl was scraped down, and (7) resuming mixing at said medium speed for 1.0 minute. The amount of water added in each case was that required to give the plastic mortar a workability equivalent to a penetration of 62 mm. by a standard cone weighing 200 grams and falling freely from a height of 9 cm. The density, time to initial and final set and the 7 and 28 day compressive strengths for each mortar test sample were determined by standard ASTM methods. The results obtained are shown in Table IV.

TABLE IV

| Mortar Batch No. | Admixture | | Net Mixing Water, g. | Density, gm./cc. | Time to Set | | Compressive Strength, p.s.i. | |
|---|---|---|---|---|---|---|---|---|
| | Name | Dosage, Percent of Cement (Dry Basis) | | | Initial, hrs. | Final, hrs. | 7 Day Cure | 28 Day Cure |
| 1 | None | | 565 | 2.25 | 3.4 | 5.3 | 2,890 | 5,450 |
| 2 | Product L | .24 | 519 | 2.26 | 5.8 | 7.7 | 4,230 | 6,830 |

We claim:
1. In a process for producing Portland cement slurries, the improvement which comprises mixing with the cement, water having in solution a dispersant for the cement in an amount between 0.01 and 0.30% by weight, on a dry basis, based on the cement, said dispersant being the water-soluble product of reacting a water-soluble carbohydrate of the group consisting of a monosaccharide, sucrose, partially hydrolyzed starch and mixtures thereof with a water-soluble salt of sulfurous acid in an amount equivalent to 0.05 to 0.40 part of $SO_2$ per part of carbohydrate at a temperature of 120 to 170° C. until from 15 to 75% of the carbohydrate is converted into a water-soluble complex, whereby the amount of water necessary to form the cement-containing article is materially reduced and the strength of the resulting set article is improved.

2. The process of claim 1 wherein the water-soluble salt of sulfurous acid is a sulfite of the group consisting of alkali metal and ammonium sulfite.

3. The process of claim 1 wherein the water-soluble salt of sulfurous acid is a bisulfite of the group consisting of alkali metal and ammonium bisulfite.

4. The process of claim 1 wherein the water-soluble product is formed by reacting corn syrup, having a specified dextrose equivalent of 41.5 to 44.5, with sodium bisulfite, in an amount equivalent to 0.10 part of $SO_2$ per part of corn syrup solids, for 30 minutes at 140° C., the reactants comprising a solution having a concentration of about 45% solids, and neutralizing the reaction product with sodium hydroxide to pH 7.0.

5. In a process for producing concrete comprising a mixture of sand, gravel, Portland cement and water, the improvement which comprises adding to the water a dispersant for the cement in an amount between 0.01 and 0.30% by weight, on a dry basis, based on the Portland cement, said dispersant being the water-soluble product of reacting a water-soluble carbohydrate of the group consisting of a monosaccharide, sucrose, and a partially hydrolyzed starch with a water-soluble salt of sulfurous acid in an amount equivalent to 0.05 to 0.40 part of $SO_2$ per part of carbohydrate at a temperature of 120 to 170° C. until from 15 to 75% of the carbohydrate is converted into a water-soluble complex, whereby the amount of water necessary to form the concrete is materially reduced and the strength of the concrete is improved.

6. The process of claim 5 wherein the water-soluble salt of sulfurous acid has a cation of the group sodium, potassium and ammonium.

7. In a process for producing mortar comprising a mixture of sand, Portland cement and water, the improvement which comprises adding to the water a dispersant for the cement in an amount between 0.01 and 0.30% by weight, on a dry basis, based on the Portland cement, said dispersant being the water-soluble product of reacting a water-soluble carbohydrate of the group consisting of a monosaccharide, sucrose, and a partially hydrolyzed starch with a water-soluble salt of sulfurous acid in an amount equivalent to 0.05 to 0.40 part of $SO_2$ per part of carbohydrate at a temperature of 120 to 170° C. until from 15 to 75% of the carbohydrate is converted into a water-soluble complex, whereby the amount of water necessary to form the mortar is materially reduced and the strength of the mortar is improved.

References Cited

UNITED STATES PATENTS

| | | | |
|---|---|---|---|
| 2,229,311 | 1/1941 | Scripture | 106—92 |
| 2,429,211 | 10/1947 | Andes | 106—92 |
| 2,485,102 | 10/1949 | MacPherson et al. | 106—90 |
| 2,690,975 | 10/1954 | Scripture | 106—90 |
| 2,860,060 | 11/1958 | Benedict et al. | 106—90 |
| 2,927,033 | 3/1960 | Benedict et al. | 106—90 |

TOBIAS E. LEVOW, *Primary Examiner.*

S. E. MOTT, *Assistant Examiner.*